United States Patent [19]
Hanson

[11] Patent Number: 6,035,203
[45] Date of Patent: *Mar. 7, 2000

[54] TIME BASED PAGING FOR MOBILE TELEPHONE UNITS

[75] Inventor: Robert Joseph Hanson, Naperville, Ill.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/774,116

[22] Filed: Dec. 24, 1996

[51] Int. Cl.$^7$ .................................................. H04Q 7/20

[52] U.S. Cl. ......................... 455/458; 455/422; 455/435

[58] Field of Search .................................. 455/33.1, 403, 455/418, 422, 436, 456, 458, 432, 435

[56] References Cited

U.S. PATENT DOCUMENTS

| | | | |
|---|---|---|---|
| 5,153,902 | 10/1992 | Buhl et al. | 455/458 |
| 5,369,681 | 11/1994 | Boudreau et al. | 455/458 |
| 5,463,672 | 10/1995 | Kage | 455/33.1 |
| 5,524,136 | 6/1996 | Bar-Noy et al. | 455/458 |
| 5,734,984 | 3/1998 | Reece et al. | 455/436 |

*Primary Examiner*—Dwayne D. Bost
*Assistant Examiner*—Nay Maung

[57] ABSTRACT

An arrangement for paging mobile telephone units (MTU) in a cellular mobile system that conserves paging resources. If the elapsed time since the most recent registration of an MTU is small, then an initial page covering only the cell of the most recent cell location for the target MTU, and the neighboring cells for that cell, is used. Advantageously, since the likelihood that the MTU is still within that cell or its neighbors is high, so that paging resources are conserved by paging in only a small number of cells.

13 Claims, 5 Drawing Sheets

TIME BASED PAGING FOR MOBILE TELEPHONE UNITS

RELATED APPLICATION

This application is related to an application by R. J. Hanson, entitled "Improved Location Based Paging for Mobile Telephone Unites" being filed concurrently herewith and being assigned to the assignee of this application.

TECHNICAL FIELD

This invention relates to the arrangement for paging cellular mobile telephone units in a wireless cellular telecommunications system.

PROBLEM

Wireless cellular telecommunications systems have become popular in the past decades because such systems allow reuse of the same radio channel in many different cells in the metropolitan area, thus greatly increasing the number of simultaneous communications in that area. With a cellular system, it is necessary to know where a wireless cellular mobile telephone unit (MTU) is located in order to communicate with that MTU from a base station in the same cell as that MTU. When an MTU originates a call, its signal is detected by the nearest base station; the act of originating transmits a radio signal which allows an MTU to be located. However on a terminating call, the wireless cellular system may not know where the terminating MTU (target MTU) is to be found. This problem is solved by sending a paging signal identifying the target MTU and having that MTU respond to the page. The paging is performed over a paging channel to which the MTU is tuned when power is on but the MTU is idle. The MTU tunes to the strongest paging channel when it is moving, if the present paging channel signal drops below a threshold.

In the earliest wireless systems, paging for any station was done throughout a metropolitan area. However as the volume of traffic increased, it was found necessary to restrict the paging to a much smaller area, a zone, in order to preserve the bandwidth of the paging channels.

In order to permit the system to locate a zone, i.e., a predefined plurality of adjacent cells, wherein the target MTU is most likely to be found, a MTU performs a periodic autonomous registration process wherein it transmits a signal to indicate its identity; the transmitted signal allows the cellular system to locate the cell in which the MTU can presently be found.

A problem of the prior art is that even initially paging only in all cells of a zone and, if the target station is not found in the zone, paging in all cells served by a mobile switching center limits the capacity of the mobile switching center.

SOLUTION

The above problem is alleviated and an advance is made over the teachings of the prior art in accordance with applicant's invention wherein the cellular system keeps track of the most recent time that an MTU's location was registered, autonomously or otherwise; if the elapsed time since this most recent registration is less than a predetermined parameter, i.e, a first threshold, then the initial page is restricted to the cell for which the MTU was registered and its neighboring cells. The registration process identifies a cell or some other sub-zone defined by that cell in order to minimize the paging resources required for an initial page. Advantageously, because a MTU has a relatively high probability of still being in the same cell or an adjacent cells if the time since the most recent registration is relatively short, the probability of finding the station on a limited initial page is relatively high. Clearly, if the target MTU is found in the same cell or its adjacent cells, paging bandwidth in other cells is conserved. If the probability of finding the MTU on such an initial page is sufficiently high, then the increase of average paging time over all calls is acceptable in view of the conservation of paging resources.

In accordance with one feature of applicant's invention, the location of the MTU is recorded at the time of disconnect of a call as well as after an autonomous registration (i.e., geographical registration, or time based registration or registration following power-up); timing starts from the time that the MTU location was most recently recorded.

Advantageously, the number of occasions in which a subscriber is to be paged within the time limit for paging only the primary cell and its immediate neighbors on a first page is substantially increased.

In accordance with one specific embodiment of applicant's invention, if the time since the most recent location was recorded exceeds a second threshold, the zone paging step is skipped and the cellular system immediately performs a page of all cells controlled by a mobile switching center. In accordance with another feature of applicant's preferred embodiment, if the time since the most recent recording of the location of the exceeds a third threshold, a flood paging of all the cells in the metropolitan area is immediately attempted.

For a system in which the cells are quite small because of the large amount of traffic being handled in an area, the definition of a neighboring cell is extended to include an additional ring of neighbors so as to increase the probability that the initial page when used is likely to find the target MTU.

DETAILED DESCRIPTION

Figure 1:
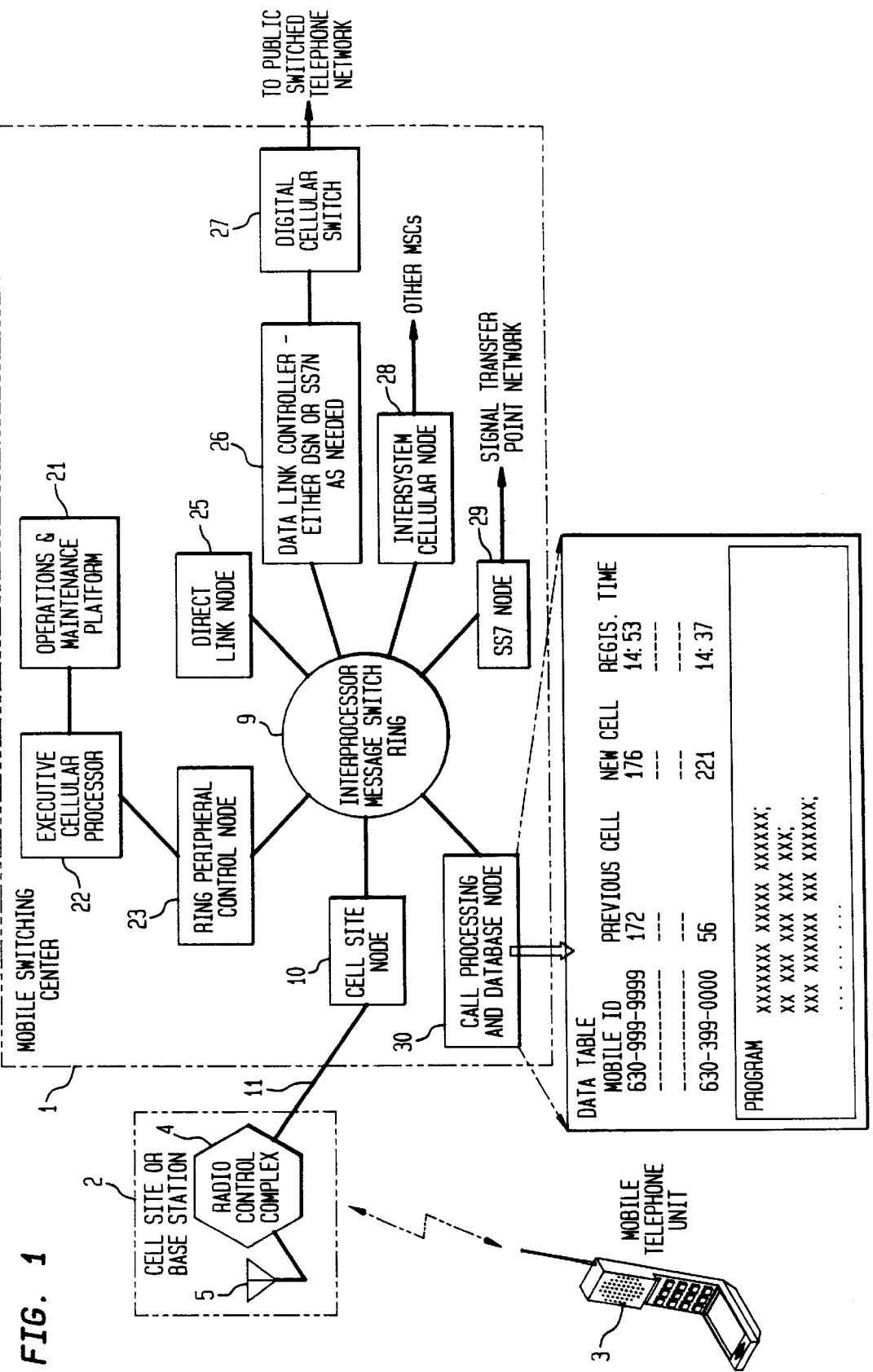
FIG. 1 is a block diagram of a preferred embodiment of applicant's invention.

FIG. 1 is a block diagram of a mobile switching system. The central switching element of this system is a mobile switching center (MSC) 1. The mobile switching center communicates via a plurality of voice paths (not shown) and a control link with a cell site or base station 2. The cell site in turn communicates by radio with a cellular mobile telephone unit 3. Inside the cell site is a radio control complex (RCC) 4 connected to an antenna 5 for communicating radio signals with the MTU 3. The MSC in applicant's preferred embodiment is an Autoplex® 1000 system generally described in U.S. Pat. No. 4,827,499. The MSC includes an interprocessor message switch 9 in the form of a ring data switch for interconnecting the major units of the MSC. A cell site node CSN 10 connected to IMS ring 9 is used for communicating with the cell site via data link 11; in particular, one or more CSNs are used to transmit paging request messages over data links 11 to cell sites to request them to page a target MTU. The backup database is an operations and maintenance processor (OMP) 21 which communicates with an executive cellular processor (ECP) 22 which in turn communicates with the Ring Peripheral Control Node (RPCN) 23 for supplying data concerning the MTUs served by the MSC.

A direct link node (DLN) 25 is used for controlling communications among the units connected to the IMS ring 9 destined for units outside the nodes of the ring. Also connect to IMS ring 9 is a data link controller DLC 26 for transmitting signaling messages to a digital cellular switch (DCS) 27. This digital cellular switch can be, for example a 5ESS® switch or a Definity® PBX switch, both manufactured by Lucent Technologies Inc. This digital cellular switch has connections (not shown) to the voice channels to the cell sites controlled by MSC 1 and also has voice channels connected to the public switched telephone network (PSTN) for communicating with land based lines or other mobile switching centers. Inter MSC connection node (ICN) 28 is used to communicate data messages to other MSCs. Signaling system 7 node (SS7N) 29 is used to communicate signaling messages to the signal transfer point (STP) network in order to transmit these messages to another switch such as another MSC.

Finally, call processing and database node (CDN) 30 is used for controlling cellular calls. The CDN include processor for controlling the paging process. The processor includes a central processing unit (not shown) and memory for storing program text and data, shown in FIG. 1. The decision of which cells to perform a page for any call at any particular time is made in this node. The node includes a processor that contains both a data table and a program. Part of the program is used to implement the processes described in FIG. 5. In addition, and, where necessary, in cooperation with RPCN 23, the CDN maintains a record of the most recent location ("new cell") where a particular MTU was most recently located and the time of the registration or location of that MTU.

Figure 2:
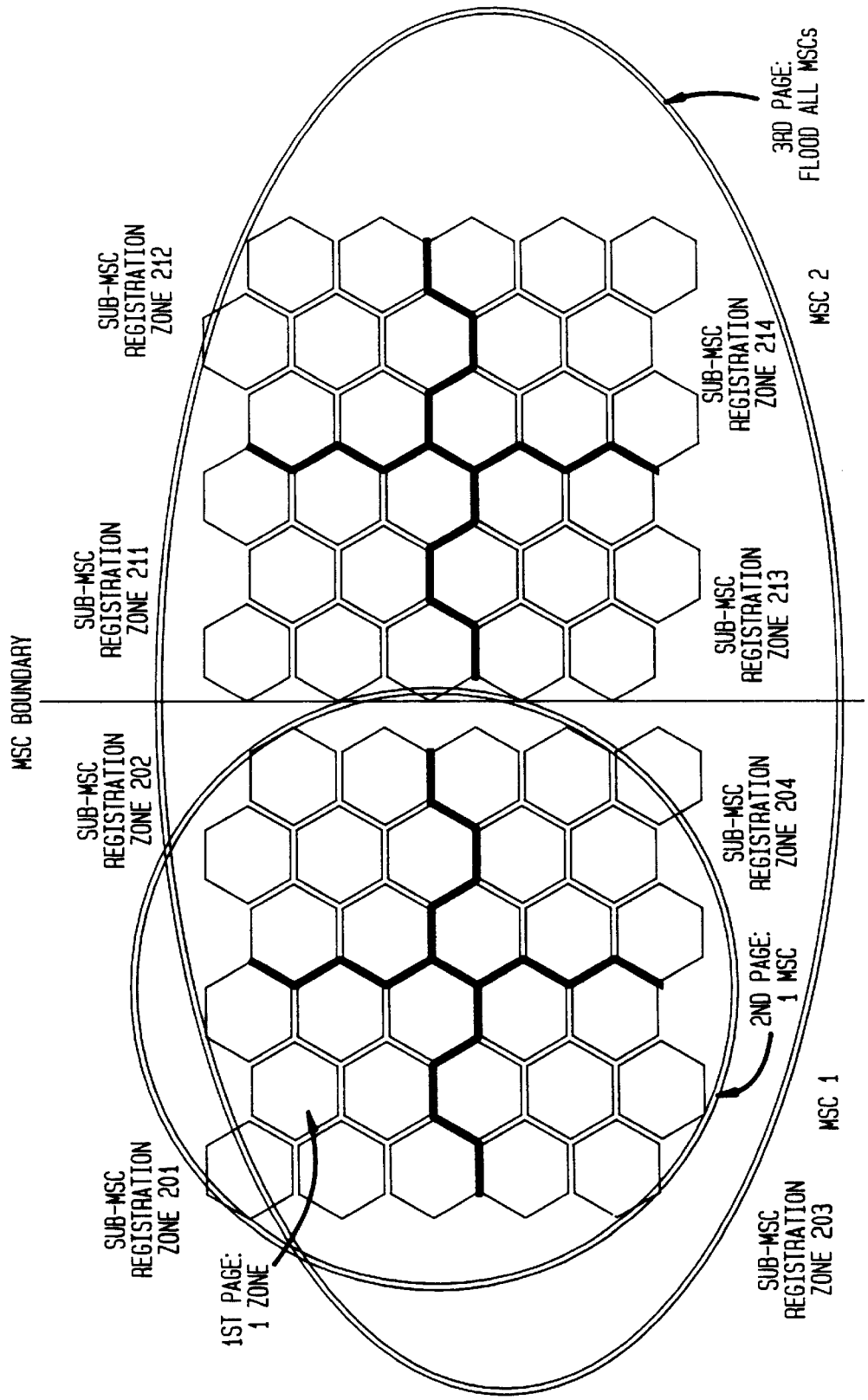
FIGS. 2–4 illustrate cellular division of a metropolitan area and the various cellular arrangements, including applicant's new selective paging arrangement, in which mobile telephone units can be paged.

FIG. 2 illustrates the prior art arrangement for paging a target MTU. Shown are 8 zones in two mobile switching centers. Each zone comprises a plurality of cells not all of which are shown on the diagram. The heavy line shows the demarcation between zones. A typical paging operation would initially page from all the cells of one zone, such as zone 201. If that page failed to locate the target MTU, then all cells of all zones controlled by 1 MSC such as zones 201, 202, 203, and 204 would be paged. If this still did not succeed in locating the target MTU then a so-called flood paging would be tried. This would be a paging of all zones of all the MSCs in an area. In this case, where the area is controlled by two MSCs, the flood paging would be a paging of all cells in zones 201, 202, 203, 204, 211, 212, 213 and 214.

Figure 3:
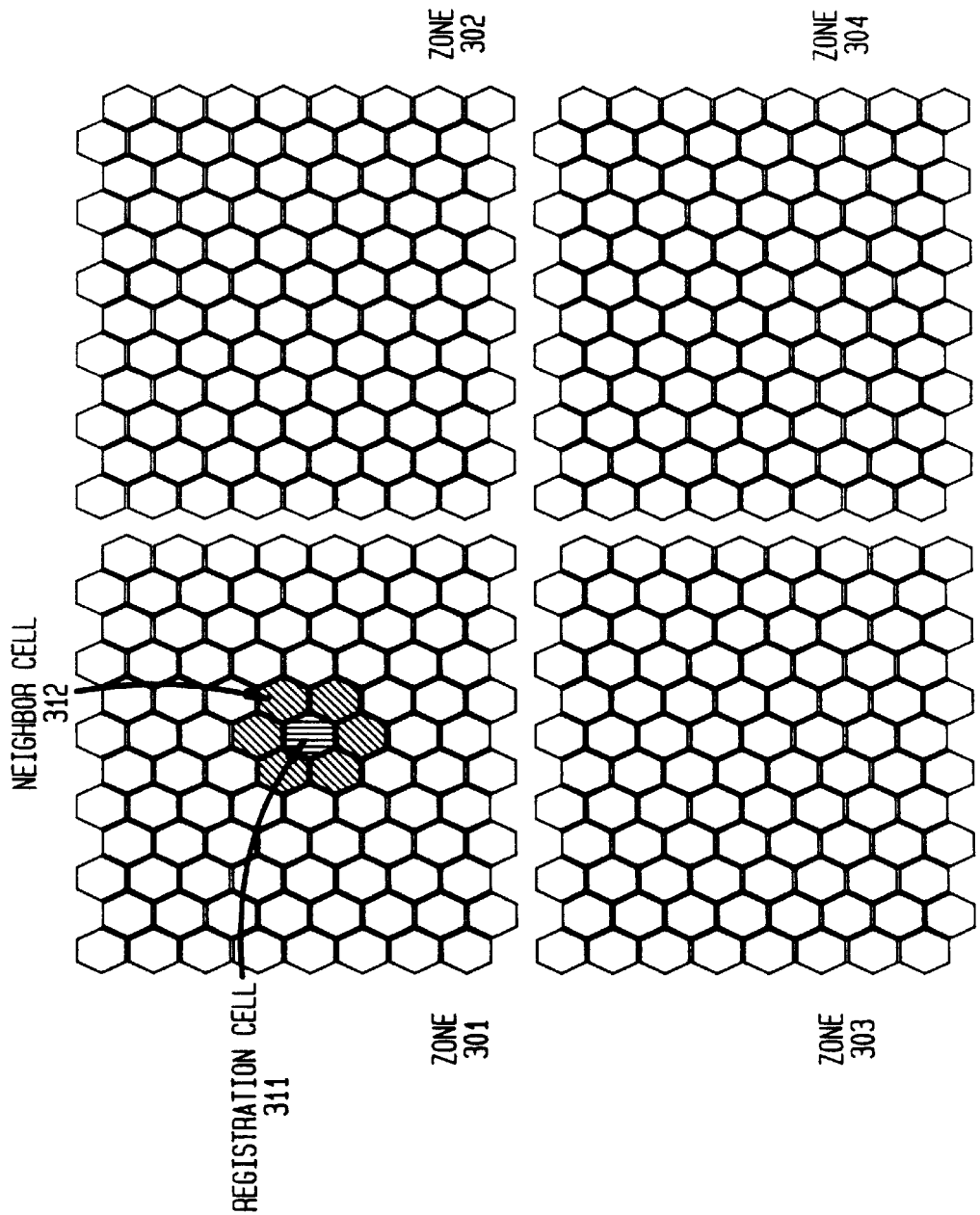

FIG. 3 shows some of the concepts that are used to support applicant's invention. This diagram also shows four zones controlled by one MSC, namely zones 301, 302, 303 and 304. Within zone 301 a registration cell, 311, is shown. This is the cell in which the MTU was found at the time of the most recent registration or location. Surrounding registration cell 311 are six neighbor cells such as cell 312.

Figure 4:
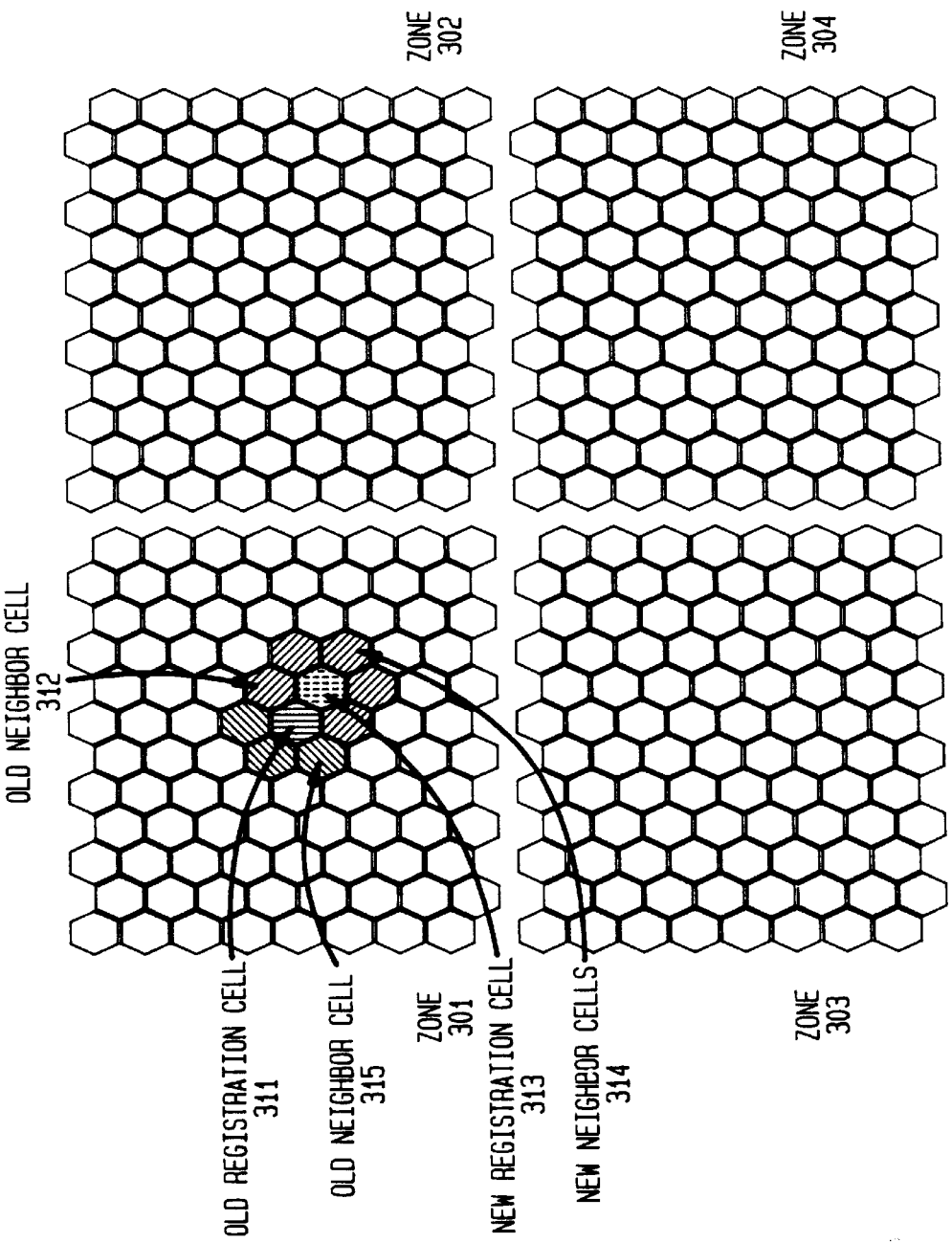

FIG. 4 shows that when a mobile moves, for example from its initial position in cell 311 to a new position in cell 313, the new registration cell 313 has new neighbor cells, such as cell 314, which were not previously a neighbor cell, and some previous neighbor cells, such as cell 315, which are no longer neighbor cells of the new registration cell.

Figure 5:
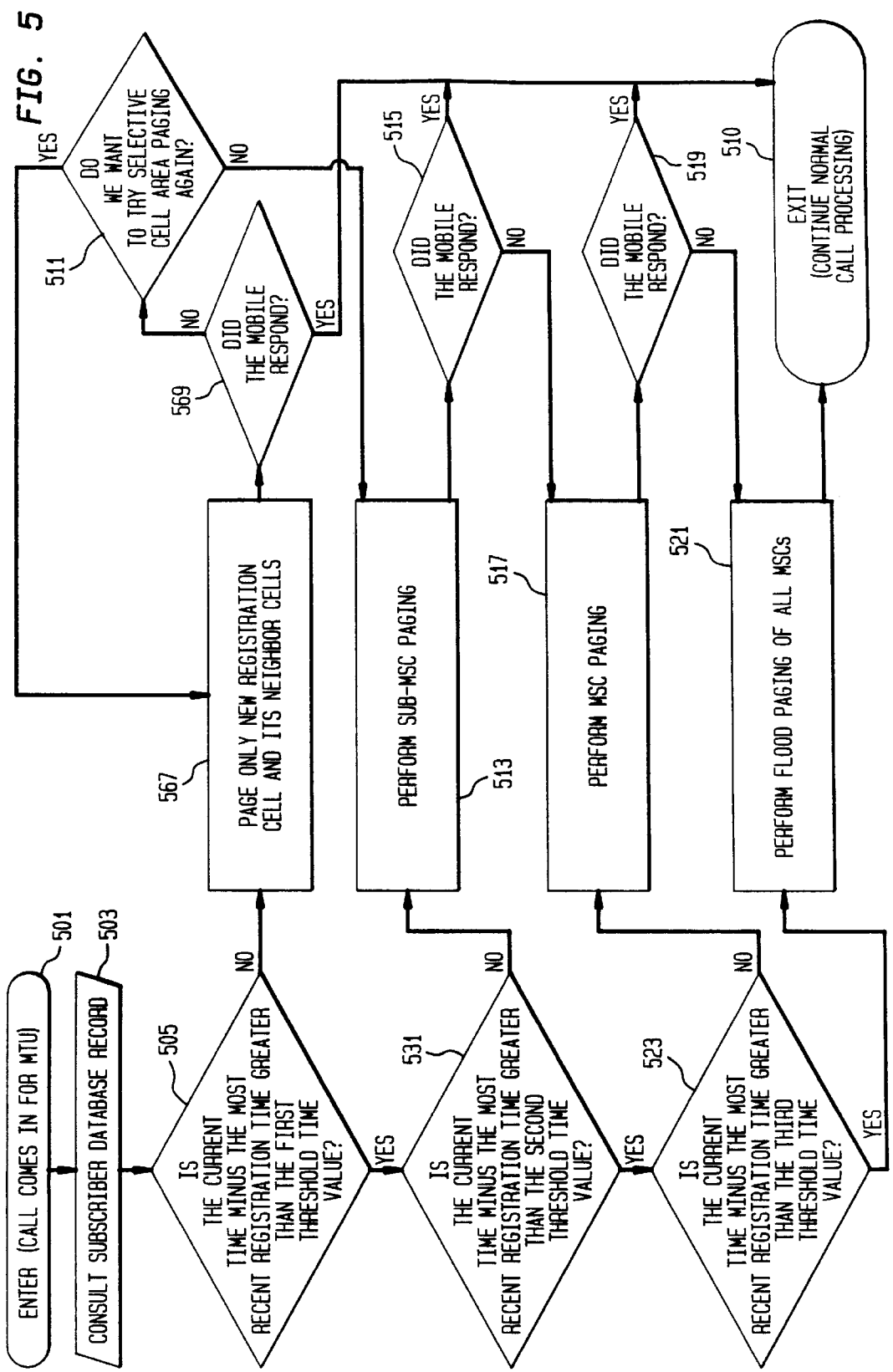
FIG. 5 is a flow diagram of an arrangement for controlling paging in accordance with applicant's invention.

FIG. 5 is a flow diagram illustrating the process used to control paging in accordance with applicant's invention. The process is controlled by the processor of the CDN. The basic objective is to try to anticipate cases wherein the target MTU is likely to be close to the cell where it was most recently found. Close can be that cell plus a ring of immediate neighbors, that cell plus two rings of neighbors, or simply a list of cells defining a neighborhood for each cell. When it is anticipated that the MTU is close to the cell where it was most recently found, an initial page restricted to that cell and cells close to it, as discussed herein, is likely to find the target MTU.

The process starts when a call comes in for the target MTU (enter block 501). The subscriber database record is consulted (action block 503) to determine the time of the most recent registration or other location action and to find the identification of the cell in which the MTU was most recently found (new cell). Test 505 is used to determine if the elapsed time since the most recent registration or location exceeds a first threshold. If not, this is an indication that the MTU is likely to be near its previous location and therefore that only the new registration cell and its neighbors should be paged.

Note that if the cells are very small because of the high volume of traffic in the area, the neighboring cells can be extended to include two rings of neighbors. The decision on one versus two rings of neighbors is made based on a parameter set by the cellular operator, as well as whether or not the selective page had already been tried once. If the result of test 505 is negative, then only the new registration cell and its neighbors are paged (action block 507). Test 509 is used to determine whether the mobile responded to the page of action block 507. If the mobile has responded, then the normal call processing for the call is continued (exit block 510). If the mobile has not responded, then test 511 is used to determine whether the selective cell area paging is to be tried again. If so, action block 507 is reentered. If selective cell paging is not to be tried again, then the cellular system performs sub-MSC (zonal) paging. Test 515 is used to determine whether the mobile responded. If so, then normal call processing is continued (action block 510). If not, then MSC paging is performed (action block 517) wherein test 519 is used to determine whether the mobile responded; if so, then normal call processing is continued (action block 510). If not, then flood paging is performed (action block 521) and normal call processing is continued following flood paging.

If the result of test 505 indicated that the first threshold had been exceeded, then test 531 determines whether a second threshold has been exceeded. (Thresholds are listed in ascending order, the first threshold being lowest.) If not, action block 513 and the subsequent actions succeeding that action block are executed. If the second threshold has been exceeded, then test 523 is used to determine whether a third threshold has been exceeded. If not, action block 517 and its subsequent actions are executed. If the third threshold has been exceeded, the system goes directly to the performance of flood paging (action block 521).

This arrangement performs selective paging when it is likely to be useful, and also skips the zonal paging or even the MSC paging when these steps are not as likely to yield positive results. Advantageously, this saves paging resources when selective paging can be used and save some resources, but also saves substantial setup time when zonal paging is not likely to yield positive results.

The above description is of one preferred embodiment of applicant's invention. Many variations are possible within the scope of this invention. For example, the skip to immediate flood paging or even MSC paging need not be provided. The option to repeat the selective paging step can be eliminated. The scope of this invention is thus only limited by the claims.

I claim:

1. In a cellular wireless telephone communications system, a method of paging a terminating target MTU (Mobile Telephone Unit), comprising the steps of:

recording an identity of a cell in which said target MTU was most recently located;

recording a time of day when said identity was recorded;

responsive to subsequent request to page said target MTU, prior to performing a paging action, determining whether the elapsed interval of time between the time of day when said identity was recorded and the time of day of the receipt of said subsequent request to page said target MTU, exceeds a first threshold; and if said determination finds that said first threshold was not exceeded, initially paging only over the identified cells and the cells neighboring to that cell;

if said determination finds that said first threshold was exceeded, paging over a larger group of cells than if said first threshold was not exceeded;

wherein an area served by said cellular wireless telecommunications system comprises a plurality of location areas, and each location area comprises a plurality of cells;

wherein said cells neighboring to that cell need not be in a common location area.

2. The method of claim 1 wherein the steps of paging only over the identified cell location and the cells neighboring to that cell further comprises also paging over immediate neighbors of said neighboring cells.

3. The method of claim 1, further comprising the step of:

if said determination finds that said first threshold was exceeded, initially performing a zonal page.

4. The method of claim 3 wherein so the step of initially performing a zonal page comprises the step of initially performing said zonal page only if said elapsed interval does not exceed a second threshold.

5. The method of claim 4 further comprising the step of:

if said elapsed interval exceeds said second threshold, initially performing an MSC page.

6. The method of claim 1 further comprising the step of:

if said elapsed interval exceeds a third threshold, initially performing a flood page.

7. The method of claim 1 further comprising the step of:

if the initial paging fails to receive a response from said target MTU, repeating said initial paging.

8. In a cellular wireless telecommunications system, apparatus for controlling paging of a terminating target MTU, (Mobile Telephone Unit) comprising:

means for communicating with a plurality of base stations; and processor means for controlling transmission of page request messages to selected ones of said plurality of base stations;

said processor means operative under the control of a program 4:

recording an identity of a cell in which said target MTU was most recently located, and a time of day at which said target MTU was located;

responsive to receipt of a subsequent paging request, prior to performing a paging action, determining if an elapsed interval of time between the time of day when said identity was recorded, and the time of day of the receipt of said subsequent request to page said target MTU, exceeds the first threshold; and if said elapsed interval of time does not exceed said first threshold, initially sending page request messages per page performed only by the identified cell and neighbors of said identified cell;

if said elapsed interval exceeds said first threshold, initially sending page request messages for page performed by a larger group of cells than the group to which page request messages are sent if said elapsed interval does not exceed said first threshold;

wherein an area served by said cellular wireless telecommunications system, comprises a plurality of location areas, and each location area comprises a plurality of cells;

wherein said cells neighboring to that cell need not be in a common location.

9. The apparatus of claim 8 wherein said processor means is further operative under the control of said program for:

if said elapsed interval does not exceed said first threshold, initially sending page request messages for a page by immediate neighbors of immediate neighbors of said identified cell.

10. The apparatus of claim 8 wherein said processor means is further operative under the control of said program for:

if said elapsed interval exceeds said first threshold, initially sending page request messages for performing a page throughout a paging zone.

11. The apparatus of claim 10 wherein said processor means is further operative under the control of said program for:

initially sending page request messages for performing a page over a paging zone only if said elapsed time does not exceed a second threshold.

12. The apparatus of claim 11 wherein said processor means is further operative under the control of said program for:

initially sending page request messages for performing a page throughout cells controlled by a mobile switching center is said elapsed time exceeds said second threshold.

13. The apparatus of claim 8 wherein said processor means is further operative under the control of said program for:

controlling application of a flood page is said elapsed interval exceeds a third threshold.

* * * * *